United States Patent
Wilson et al.

(10) Patent No.: US 8,972,448 B2
(45) Date of Patent: Mar. 3, 2015

(54) CLOUD STORAGE OF GAME STATE

(71) Applicants: Tom Wilson, Mountain View, CA (US);
Haru Sakai, Mountain View, CA (US);
Prabhdeep Gill, Toronto (CA)

(72) Inventors: Tom Wilson, Mountain View, CA (US);
Haru Sakai, Mountain View, CA (US);
Prabhdeep Gill, Toronto (CA)

(73) Assignee: Google Inc., Mountain View, CA (US)

( * ) Notice: Subject to any disclaimer, the term of this patent is extended or adjusted under 35 U.S.C. 154(b) by 99 days.

(21) Appl. No.: 13/630,427

(22) Filed: Sep. 28, 2012

(65) Prior Publication Data

US 2013/0086114 A1    Apr. 4, 2013

Related U.S. Application Data

(60) Provisional application No. 61/542,053, filed on Sep. 30, 2011.

(51) Int. Cl.
*G06F 17/30*    (2006.01)

(52) U.S. Cl.
CPC ................ *G06F 17/30575* (2013.01)
USPC ........................................ 707/783

(58) Field of Classification Search
CPC ................................. G06F 17/30575
USPC ........................................ 707/783
See application file for complete search history.

(56) References Cited

U.S. PATENT DOCUMENTS

| | | | |
|---|---|---|---|
| 7,366,742 B1 * | 4/2008 | Umbehocker et al. ............... | 1/1 |
| 2003/0007464 A1 * | 1/2003 | Balani ............................ | 370/310 |
| 2008/0059502 A1 * | 3/2008 | Kobayashi ..................... | 707/101 |
| 2009/0075735 A1 | 3/2009 | Trang | |
| 2009/0131151 A1 | 5/2009 | Harris et al. | |
| 2010/0009747 A1 | 1/2010 | Reville et al. | |
| 2010/0010944 A1 | 1/2010 | Cheng et al. | |

(Continued)

OTHER PUBLICATIONS

Brett Molina, "Sony adding cloud-based game saves to PlayStation 3", Mar. 9, 2011, USA Today, http://content.usatoday.com/communities/gamehunters/post/2011/03/sony-adding-cloud-based-game-saves-to-playstation-3/1#.UGSWSk3A_Zg.

(Continued)

*Primary Examiner* — Apu Mofiz
*Assistant Examiner* — Dara J Glasser
(74) *Attorney, Agent, or Firm* — Lowenstein Sandler LLP

(57) ABSTRACT

Methods, systems, and computer programs are presented for managing game state for one or more games accessed by devices of a user. One method includes an operation for providing a database on a server. The database is accessible by the devices of the user and is structured to identify one or more applications of the user, each application being associated with a plurality of slots, and each slot including metadata and a map table. Further, an Application Programming Interface (API) is provided to enable access to the database. The method further includes an operation for receiving a request using the API from an application executed at one of the devices of the user. The request identifies a first slot associated with the application and an action to perform regarding one or both of the metadata and the map table. The request from the application is verified, including comparing a first version associated with the first slot and a second version provided in the request. The action is enabled if the comparing indicates that the second version is not stale, else the request is denied.

12 Claims, 7 Drawing Sheets

(56) References Cited

U.S. PATENT DOCUMENTS

2010/0229179 A1* 9/2010 Moore et al. .................. 718/104
2011/0016099 A1   1/2011 Peer et al.
2011/0208695 A1* 8/2011 Anand et al. .................. 707/610
2012/0015735 A1* 1/2012 Abouchar et al. ............. 463/42
2012/0252582 A1* 10/2012 Hilleman ....................... 463/43

OTHER PUBLICATIONS

Microsoft, "Store your saved games in the cloud", http://support.xbox.com/en-GB/xbox-live/game-saves-in-the-cloud/cloud-save-games.

ISA/U.S., The International Search Report and the Written Opinion of the International Searching Authority for International Application No. PCT/US2012/057983, Mailed Dec. 11, 2012.

* cited by examiner

CLOUD STORAGE OF GAME STATE

CLAIM OF PRIORITY

This application claims priority from U.S. Provisional Patent Application No. 61/542,053, filed Sep. 30, 2011, and entitled "CLOUD STORAGE OF GAME STATE." This provisional application is herein incorporated by reference.

BACKGROUND

1. Field of the Invention

The present invention relates to methods, systems, and computer programs for storing game data, and more particularly, methods, systems, and computer programs for storing game data on a network database.

2. Description of the Related Art

Games today are played across a wide range of devices and platforms. Often, users have the same game installed on multiple devices. For instance, Angry Birds™ is a game that can be played on many different platforms and devices. A user may have versions of the game in an iPad®, an iPhone®, an Android® device, a PC, a laptop, a Nintendo® DS, etc. All of these games are considered separate instances, meaning that the user has to replay levels on each device. There is no notion of shared, persistent progress. Additionally, if the user has preferences (e.g., sound level, key assignments), the preferences have to be re-configured on every device.

Most games have a state that is kept on the device, or in a removable drive. In some old game consoles, the data was kept in a cartridge or in a memory card. It is easy to lose the game state because it is easy to lose a memory card. In addition, the use of a memory card is inconvenient because a player that wishes to play in several devices has to carry the memory card around. Furthermore, if a user gets a new phone, and a game that the user had in the old phone is installed in the new phone, the user has to start playing from the beginning because the new phone has no record of the progress made in the game.

It is in this context that embodiments arise.

SUMMARY

Embodiments of the present invention provide methods, systems, and computer programs for storing game data on the network from a plurality of game devices. It should be appreciated that the present invention can be implemented in numerous ways, such as a process, an apparatus, a system, a device or a method on a computer readable medium. Several inventive embodiments of the present invention are described below.

In one embodiment, a method includes an operation for providing a database on a server. The database is accessible by the devices of the user and is structured to identify one or more applications of the user, each application being associated with a plurality of slots, and each slot including metadata and a map table. Further, an Application Programming Interface (API) is provided to enable access to the database. The method further includes an operation for receiving a request using the API from an application executed at one of the devices of the user. The request identifies a first slot associated with the application and an action to perform regarding one or both of the metadata and the map table. The request from the application is verified, including comparing a first version associated with the first slot and a second version provided in the request. The action is enabled if the comparing indicates that the second version is not stale, else the request is denied.

In another embodiment, a method includes an operation for, on a server, storing game data in at least one slot, the slot including slot version data. The method further includes operations for receiving a request to update the game data and a corresponding action, the request including request version data, and for determining whether the request to update is authorized based on a comparison of the slot version data and the request version data. The game data is updated based on the result of the determining, where the method is performed on a processor.

These and other embodiments can include one or more of the following features:

Providing an Application Programming Interface (API) to receive the request, where each application accesses slots that are associated with the each application, wherein each application is associated with one or more slots.

Updating the game data; and incrementing a value of the slot version data.

Sending a write success message after updating the game data when the request is authorized; or sending an error message when the request is denied.

Each slot further includes metadata and a map table, where the map table includes one or more fields and data for each of the one or more fields.

Data stored in the one or more fields includes one or more of a level, a health value, a game thumbnail, or map coordinates.

The request includes data for all the fields associated with the at least one slot.

The request includes data for some of the fields associated with the at least one slot.

Data stored in the metadata includes one or more of bytes available in the slot, a game descriptor, a time game was last saved, or search tags.

The request further includes an application identifier.

Providing a second API to retrieve statistical information about a plurality of users.

A maximum amount of data is stored in each slot.

An application maximum amount of data is stored for each application, and a user maximum amount of data is stored for each user.

The request includes data for a plurality of fields associated with the at least one slot.

Operations of the method are performed by a computer program when executed by one or more processors, the computer program being embedded in a non-transitory computer-readable storage medium.

In another embodiment, a method includes an operation for providing a database on a server, the database being structured to store data in a plurality of slots. Each slot has a slot version and is associated with an application, where each application is associated with one or more slots. The method further includes another operation for providing an Application Programming Interface (API) to store and retrieve application data in the database, where each application accesses slots that are associated with the each application. In addition, the method includes an operation for determining if a database operation request received via the API for a requested slot is authorized. The database operation request includes a request version, and the database operation request is authorized based on the request version and the slot version of the requested slot. The database operation request is enabled when the database operation request is authorized.

In another embodiment, a computer program embedded in a non-transitory computer-readable storage medium, when executed by one or more processors, for managing game state for one or more games accessed by devices of a user, comprises program instructions for providing a database on a server. The database is accessible by the devices of the user and is structured to identify one or more applications of the user and each application being associated with a plurality of slots. Each slot includes metadata and a map table with fields and data. The computer program further includes program instructions for providing an Application Programming Interface (API) that enables access to the database, and program instructions for receiving a request using the API from an application executed at one of the devices of the user. The request identifies a first slot associated with the application and an action to perform regarding one or both of the metadata and the map table. Further, program instructions are included for verifying the request from the application, where the verifying includes comparing a first version associated with the first slot and a second version provided in the request. The computer program also includes program instructions for enabling the action if the comparing indicates that the second version is not stale, else denying the request.

These and other embodiments can include one or more of the following features:

Program instructions for writing data received in the request; and program instructions for incrementing a value of the first version associated with the first slot.

Program instructions for sending a success message after enabling the action; or program instructions for sending an error message if the request is denied.

The map table includes one or more fields and data for each of the one or more fields.

In yet another embodiment, a method is presented for storing game state information. The method includes an operation for receiving a request to store game data, where the request includes a user identifier, a slot identifier, and a first version identifier. A second version identifier, that is associated with the received user identifier and slot identifier, is read from a database, where each slot in the database is associated with a unique version value. Furthermore, the method includes an operation for writing the game data to the database and for incrementing a value of the second version identifier in the database when the second version identifier indicates that the first version identifier is acceptable for fulfilling the request, where the game data is written to the database in an atomic operation. The request to store game data is aborted when the second version identifier indicates that the first version identifier is unacceptable for fulfilling the request, where at least one operation of the method is executed through a processor.

Other aspects will become apparent from the following detailed description, taken in conjunction with the accompanying drawings.

BRIEF DESCRIPTION OF THE DRAWINGS

The invention may best be understood by reference to the following description taken in conjunction with the accompanying drawings.

DETAILED DESCRIPTION

The following embodiments describe methods, computer programs, and systems for managing game state for one or more games accessed by devices of a user. It will be apparent, that the present embodiments may be practiced without some or all of these specific details. In other instances, well known process operations have not been described in detail in order not to unnecessarily obscure the present embodiments.

Methods, systems, and computer programs are presented for managing game state for one or more games accessed by devices of a user. One method includes an operation for providing a database on a server. The database is operable to store game data, for one or more games, for the user. Further, the database is accessible by the devices of the user and is structured to identify one or more applications of the user.

Each application is associated with a plurality of slots, and each slot includes metadata and a map table. The metadata provides information about the data stored in the slot. In one embodiment, the metadata includes one or more of a version number, a summary string describing the data, the number of bytes available in the slot, the timestamp of the last save, how many fields have data, whether the slot is empty or not, etc.

Further, an Application Programming Interface (API) is provided to enable access to the database. Requests are received via the API, and may be sent from an application executed at one of the devices of the user. Each request identifies a first slot associated with the application and an action to perform regarding one or both of the metadata and the map table. The request from the application is verified before granting access, and the verification includes comparing a first version associated with the first slot and a second version provided in the request. The action is enabled if the comparing indicates that the second version is not stale, else the request is denied.

Figure 1:
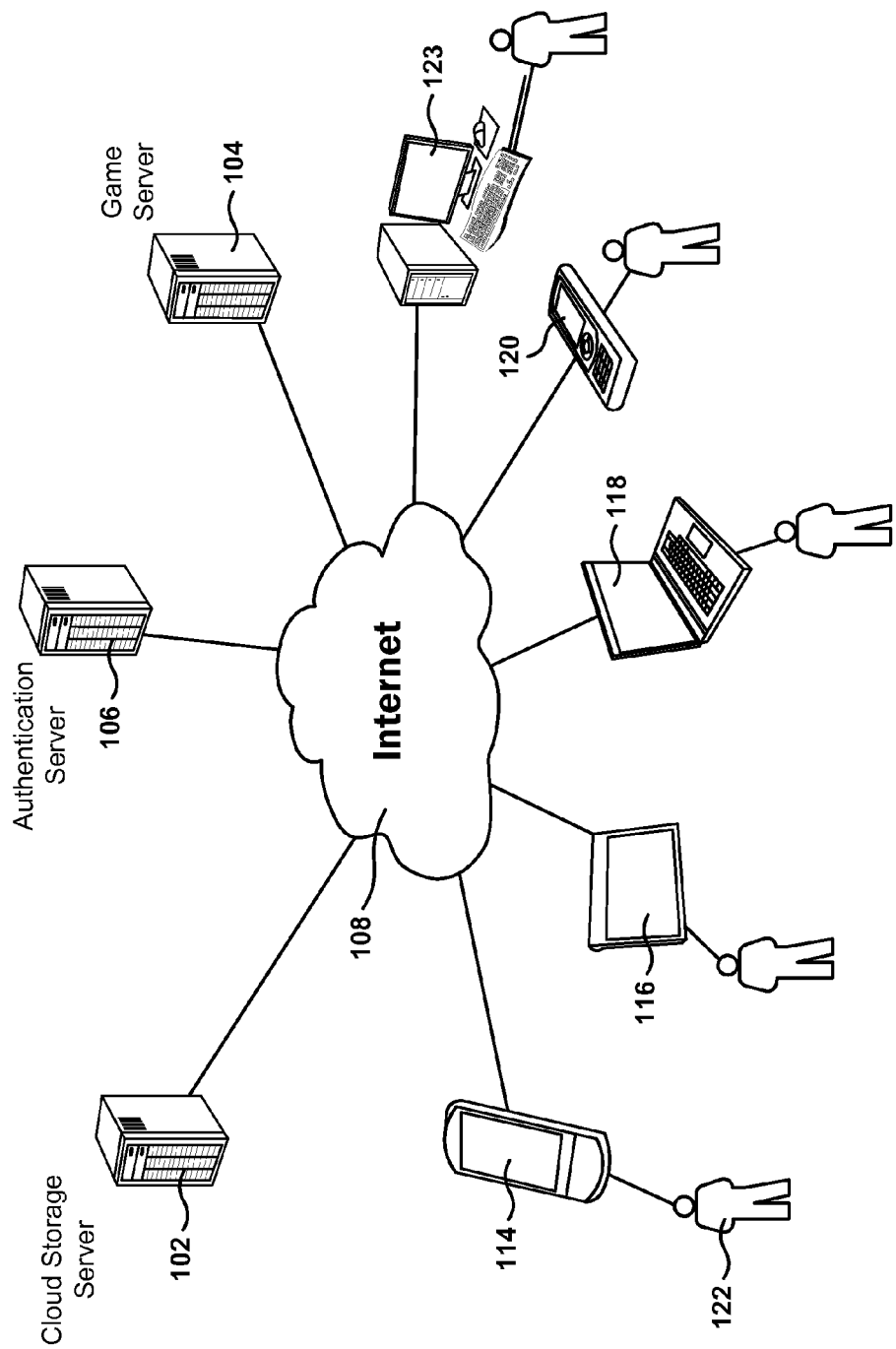
FIG. 1 illustrates the architecture of a system for implementing embodiments of the invention, according to one embodiment.

FIG. 1 illustrates the architecture of a system for implementing embodiments of the invention, according to one embodiment. In the network environment, there is a plurality of users 122 playing games. A user may play the same game in different devices such as a smart phone 114, a tablet 116, a laptop 118, a mobile phone 120, a personal computer 123, etc. These are merely examples, and any other device used to access the network can be used to implement embodiments of this invention.

Some games played on the device use local storage, which means that access to game server 104 is not required. Other games require network or game server 104 interaction to perform game operations, such as playing interactive poker. Embodiments of the invention allow games, which may be executing on a plurality of computing devices, to save game data in cloud storage server 102. Since the data is kept on the cloud storage server, the user can access a new device to play the same game by downloading game information from the cloud storage server 102.

In one embodiment, an authentication server 106 is utilized to authenticate the identity of users that wish to access game server 104 or cloud storage server 102. The cloud storage server 102 stores game information for the user, as described in more detail below with reference to FIGS. 2-7. The authentication server 106 guarantees that only the proper user accesses the game the data stored on the network. A network, such as Internet 108, allows the user devices to access any of the servers on the network or to communicate with other network devices.

It is noted that the embodiments illustrated in FIG. 1 are exemplary. Other embodiments may utilize different servers, have the functionality of one server distributed over a plurality of servers, or have the functionality of two or more servers combined into a single server. The embodiments illustrated in FIG. 1 should therefore not be interpreted to be exclusive or limiting, but rather exemplary or illustrative.

Figure 2:
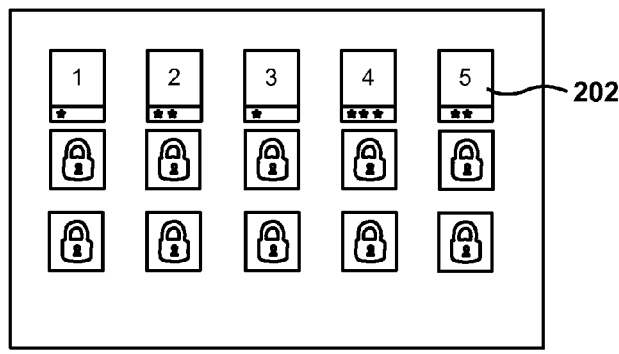
FIG. 2 includes a display snapshot of a game, according to one embodiment.

FIG. 2 includes a display snapshot of a game, according to one embodiment. FIG. 2 illustrates a snapshot of the game Angry Birds, which shows the level 202 reached by a player in one of the worlds in the game. As the player completes each level, the next level is unlocked, thereby allowing the player to play the next level. For example, to play at level 15 the player must have completed levels 1-14.

However, if the player wishes to continue playing on a different device, the game needs to be installed in the new device. When the player begins to play using the new device, the player has to go back to level 1 because the game has no notion that the player has already completed this level.

Embodiments of the invention provide a remote storage area for game developers to use, and an Application Programming Interface (API) for accessing the remote storage from any network client. In this fashion, when the player finishes playing the game in one device, the game data is stored on the network. When the player wishes to continue playing on a different device, the game data is retrieved from the network storage and utilized to continue the game where the player left off.

In one embodiment, the storage area is capped in size on a per user basis. In another embodiment, the storage area is capped per user and per game or application. For example, each application may store a maximum of 1 megabyte on the cloud storage for a given user, although other values are also possible. It is noted, that an API allows the developers different levels for partitioning the storage space, as described in more detail below.

Figure 3:
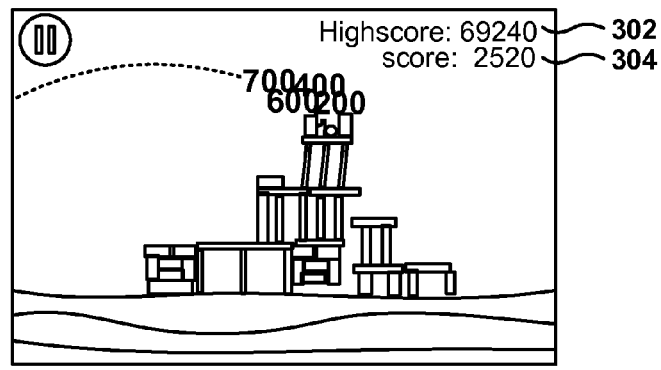
FIG. 3 includes another display snapshot of the game, according to one embodiment.

FIG. 3 includes another display snapshot of the game, according to one embodiment. FIG. 3 shows a snapshot of the display when the game is executing on a particular level. The game screen includes a high score 302, and the level score 304. The high score and the level score are examples of game data that can be stored on the network. Other values that can be stored in the network include a health level, an energy level, an inventory (weapons, tools, keys, etc.), map coordinates, level number, etc.

A simple algorithm for storing game data would be to store all the game data on the network. When the user changes devices, the user just loads all the game-state data and continues playing the game. However, this simple algorithm requires reading and storing large amounts of data. Some light computing devices, such as mobile phones, may not have the storage ability or the network bandwidth to perform these operations of writing and reading all the game data of the game.

Figure 4:
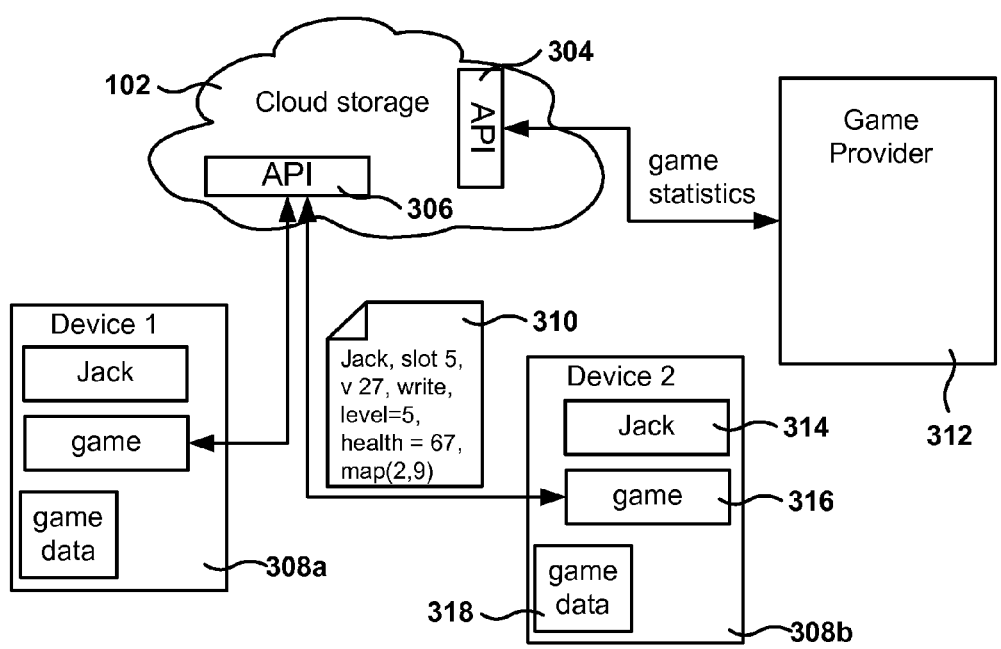
FIG. 4 illustrates the process for accessing cloud storage, according to one embodiment.

FIG. 4 illustrates the process for accessing cloud storage, according to one embodiment. A player, with a user identifier of "Jack," plays a game in a first device 308a and in a second device 308b. Each device includes a user identification (ID) 314, a game 316, and some game data 318 stored locally on the device.

The cloud storage server 102 provides an API 306 to process Remote Procedure Calls (RPC) originating at any of the devices. The data in the cloud database is stored using a user key or ID, which means that the user ID is required to process RPC calls. In one embodiment, the user authentication is performed utilizing OAuth (Open Authorization), which is an open standard for authorization. OAuth allows users to share their private resources (e.g. photos, videos, contact lists) stored on one site with another site, without having to hand out user credentials, such as username and password. OAuth allows users to hand out tokens instead of credentials to their data hosted by a given service provider. Each token grants access to a specific site (e.g. a video editing site) for specific resources (e.g. just videos from a specific album) and for a defined duration (e.g. the next 2 hours). This allows a user to grant a third party site access to their information stored with another service provider, without having to share their access permissions or the full extent of their data.

A remote procedure call (RPC) is an inter-process communication that allows a computer program to cause a subroutine or procedure to execute in another address space (commonly on another computer on a shared network) without the programmer explicitly coding the details for this remote interaction. It is noted, that although embodiments of the invention are described utilizing RPC, any other type of inter-process communication can be utilized according to the principles described herein. For example other embodiments may utilize message passing, synchronization, or shared memory to exchange data between processes.

When a game 316 wants to store data in cloud storage 102, the game 316 issues and RPC call 310, which holds the information associated with the data store. For example, the RPC call 310 may include a user ID (Jack), a slot ID, (described in more detail below), a version number for the data, the type of RPC call (e.g., write), and the game data. The RPC returns information to game 316 indicating if the requested operation was successful or unsuccessful, as well as other game data that may be returned by the server.

In one embodiment, cloud storage 102 provides a second API 304 to provide game-usage information to a game provider 312. For example, the cloud storage 102 may provide information on how many users have stored data on the cloud, how many users have played the game in the last hour, user demographic information, etc.

Figure 5:
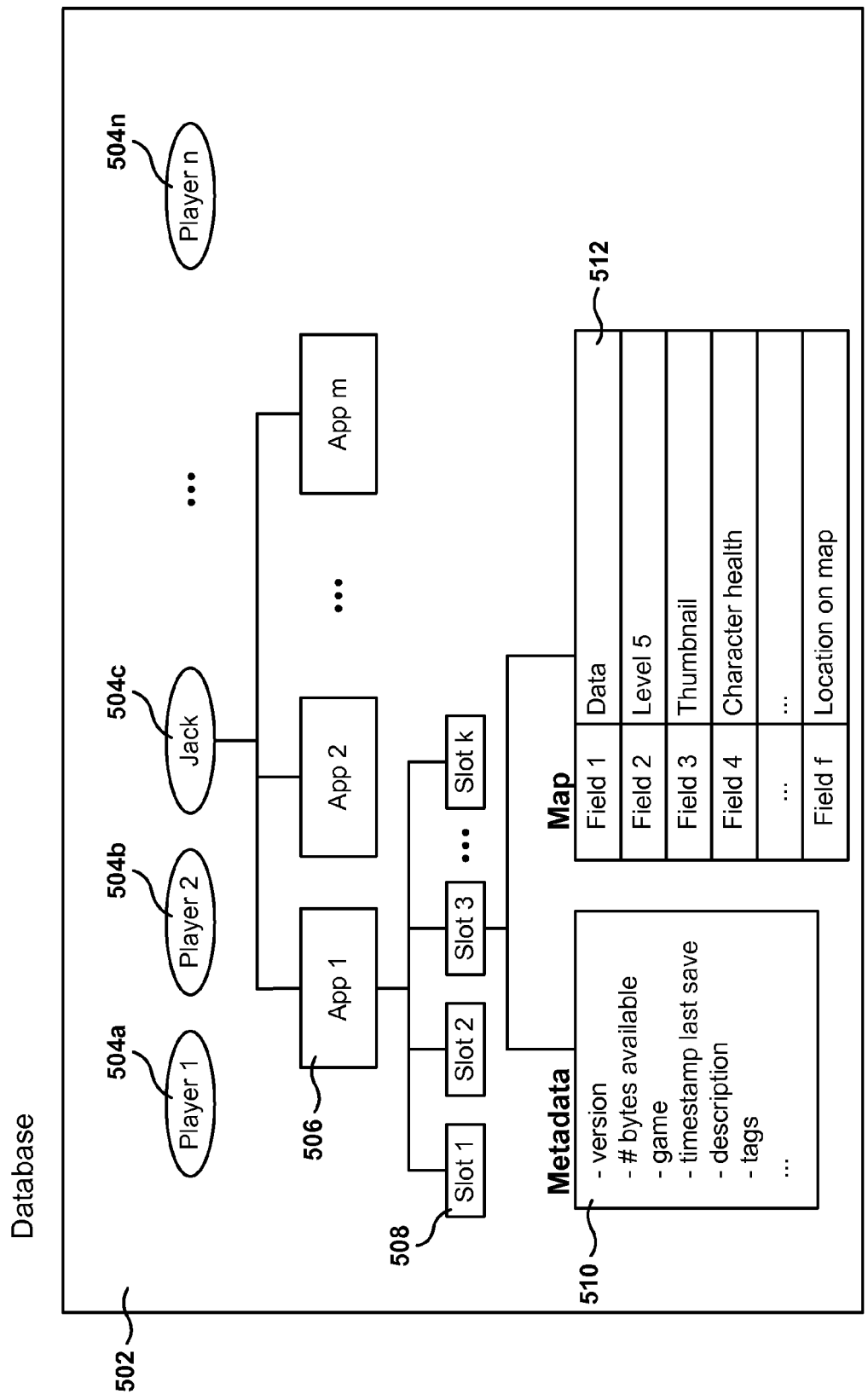
FIG. 5 presents the structure of the database, according to one embodiment.

FIG. 5 presents the structure of the database 502, according to one embodiment. The data in the database 502 is organized at a first level according to user ID. For example, the embodiment shown in FIG. 5 includes data for a plurality of users 504a-504n, where user 504C has a user ID of "Jack" in the database. For each user, the data is organized according to application 506 (Application 1-Application m). Each player may store data for a plurality of applications, and each application holds an application state. The application can be a game, but the application could also be a different type of program, such as a word processor (e.g., to store a document in progress), a web browser (e.g., to store Jack's favorites), etc. It is noted that the embodiments presented herein are described for a gaming environment, but the principles presented can be used with any other application that can benefit from storing data on the network. The embodiments illustrated in FIG. 5 should therefore not be interpreted to be exclusive or limiting, but rather exemplary or illustrative.

The space for an application is divided into slots 508. A slot is a place to store data. A slot as used herein is similar to the slots used in some game consoles, where the user is given an option to save the game in one of the slots. For example, if there are 10 slots, the user can save 10 game states. A slot is also similar to a file in a file system because both have a block of data that is accessed by a unique identifier (i.e., slot ID or file name). However, a slot is different from a file, at least, because a file may be locked by one user while a slot is never locked. This avoids the problem where a file is locked by a device, causing the file to be inaccessible by any other device. Additionally, a slot does not require an operation to "open" the slot, while files typically require an operation to open and close the file when interacting with the file system. In one embodiment, the number of slots for a given application is not limited, and in another embodiment, a limited number of slots is imposed for each application.

It is noted that, as used herein, a "first slot" and a "second slot" is a nomenclature used to reference two different slots in the database. The qualifiers "first" and "second" are used to denote that the slots are different slots, and not to denote the first slot in the database or the second slot in the database, unless otherwise noted.

In one embodiment, each slot has metadata 510 and a map table 512. The metadata provides information about the data stored in the slot. The metadata may include a version number, a summary string describing the data, the number of bytes available in the slot, the timestamp of the last save, how many fields have data, whether the slot is empty or not, etc.

The map is a table that includes field IDs, and a block of data stored per field. Fields are also referred to as keys, and the data associated with each field is also referred to as the value for the field. Each field can be full or empty, and a slot also can be full or empty. Some examples of data stored on a field are a thumbnail of the game display (i.e., a snapshot of the screen), health level, items in the inventory, keyboard mappings, screen resolution, volume level, etc. The metadata in the slot may also include tags, which are textual terms that may be utilized by the program to find data in the cloud storage.

The data can be mutated dynamically by clients. Within each slot, developers can store pairs of data for the key and value. This approach provides a high level of granularity, allowing developers to retrieve or modify only the specific data required at a given time. Transactional updates, also referred to as atomic operations, are supported on a per-slot basis, which allows developers to be confident that the data has not mutated by the action of another client while a write operation is in progress.

The tags associated with each slot provide a way to obtain information about the contents of the slot. In addition, the API provides an operation to retrieve all the slots that have metadata, i.e., retrieve all the slots that are not empty.

In one embodiment, there is a fixed maximum number of storage bytes that a player can use per game. In one embodiment, each game may store 1 megabyte, but other values are also possible. In another embodiment, there is a maximum amount of data that can be saved per slot, and in another embodiment, there is a maximum amount of data that can be saved per field.

A game developer may use different slots to store data associated with different devices. A tag stored in each slot indicates the type of device associated with the slot. For example, tags may have a value of "iPhone," "Android," "PlayStation," etc. When the developer wants to retrieve the data for the android device, a tag search for "Android" is performed, and then the data for the corresponding found slots is retrieved.

It is possible to write or read from a single field, which allows the game to change just one parameter. For example, the game may change the parameter associated with the value of health, if nothing else has changed in the game. The game does not need to update the whole slot just because one field has changed. The use of slots allows the developer to be granular in the handling of data. Furthermore, it is also possible to write or read from a subset of the fields currently present in the slot, thereby increasing the flexibility for reading or writing data.

Figure 6:
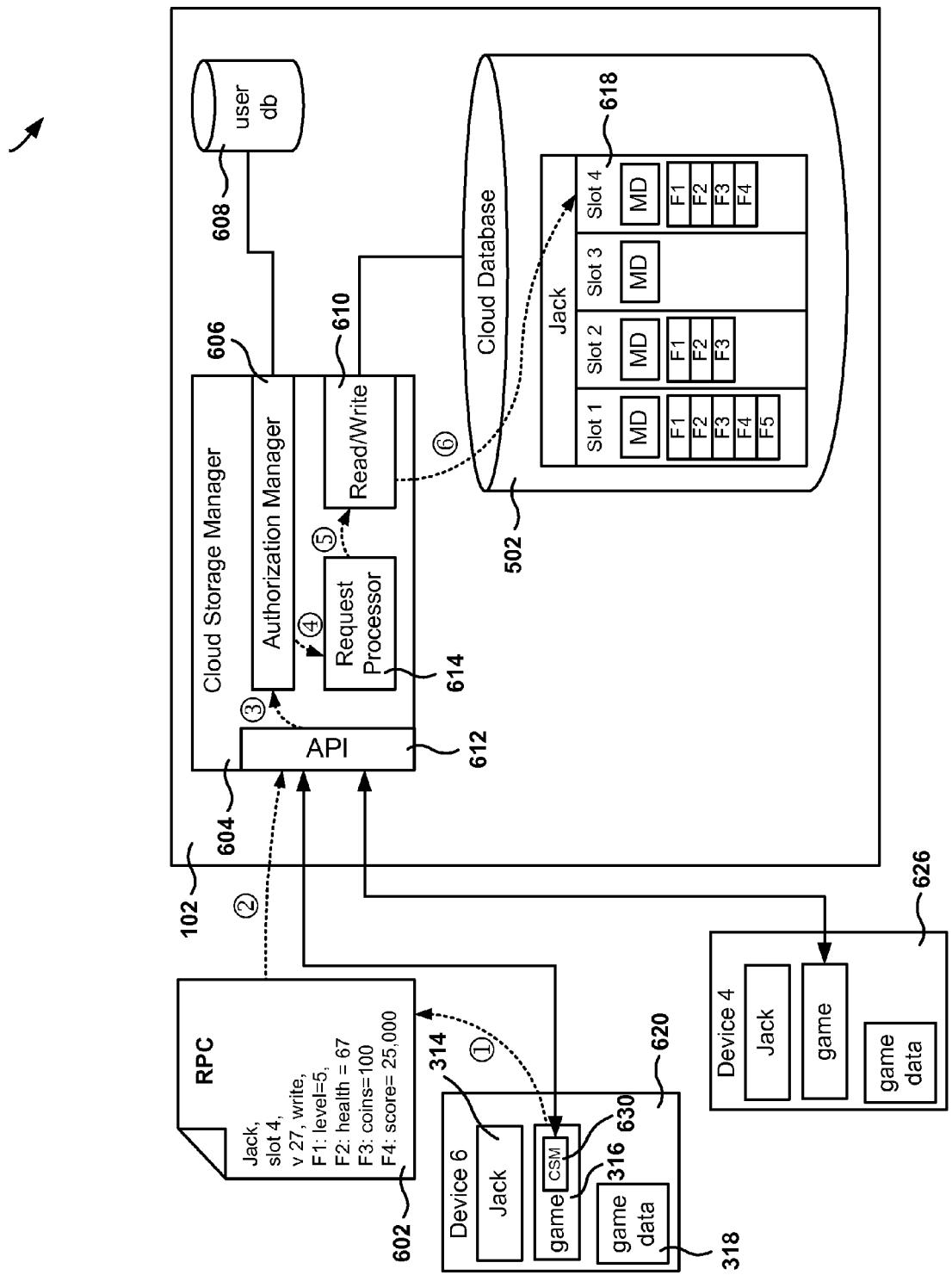
FIG. 6 illustrates the method for storing game data on the cloud storage, according to one embodiment.

FIG. 6 illustrates the method for storing game data on the cloud storage, according to one embodiment. When devices 620 and 626 wish to access the cloud storage, an RPC call 602 is made to cloud storage server 102. A cloud state manager 630 inside game 316 manages the interface with the API 612 in cloud storage server 102. The cloud state manager 630 receives requests from the game to read or write data into the cloud storage, and then makes the appropriate RPC call, or calls, to access the API 612 provided by the cloud storage server. At a high level, some of the methods made available by the API include the following:

Read slot. Reading the slot may include one or more of the following operations: read all metadata, read a piece of the metadata (e.g., space available in the slot), read a specific field, read all fields, get version, get list of filled fields, etc. The parameters included in the Read Slot call will include at least the user ID, the application, and the slot number.

Write to Slot. Writing to slot is an atomic operation, all the data passed in the RPC call is written in one operation into the database. Writing to a slot may include one or more of the following operations: write all the metadata, write a piece of the metadata, update the value of a field, update the values of several fields, update the values all fields, delete one or more fields, rename one or more fields, etc. The parameters included in the Write-to-Slot call will include at least the user ID, the application ID, the slot number, the slot version number, and the data to be stored in the database.

Get Database Info. Database information may be provided at different levels. For example information may be requested for the amount storage used by the user, amount of storage used by one application, list of applications used by the user, retrieve all the information stored by the user (assuming the program making the call has authorization to access the data for all the applications), amount of storage available, etc.

Create New Application. This call is utilized the first time that the game or application is accessing the database to create an entry in the database for this game or application. The parameters include, at least, the user ID and the application ID.

In one embodiment, the API includes, at least, the following RPC calls:

getAllMetadata(playerId, applicationId)—Returns all the metadata that exists for the specified player for the specified application.

getMetadataWithTags(playerId, applicationId, tags)—Returns the existing metadata with at least one of the specified tags.

getMetadata(playerId, applicationId, slotId)—Returns the metadata in the specified slot (if any).

getFieldData(playerId, applicationId, slotId, fields)—Returns the data contained in the specified fields.

setData(playerId, applicationId, slotId, versionNumber, metadataToSet, fieldsToSet)—Sets the metadata or the fields to the specified values, but only if the version number is correct.

It is appreciated that the API functionality described above is exemplary. Other embodiments may utilize different calls for different parameters, or my combined calls to provide a variety of functions. The embodiments illustrated for the API should therefore not be interpreted to be exclusive or limiting, but rather exemplary or illustrative.

The sample RPC call 602 of FIG. 6 is for a write operation to the database. The parameters included in the call are the user identifier (Jack), the application identifier (poker), the slot (4), the version (27), the type of operation (write), and data for fields F1-F4 (level=5, health=67, coins=100, the score=25,000).

Cloud Storage Manager 604 manages the interaction with user devices in different databases. Cloud Storage Manager 604 includes an API processor to manage requests received via the API, an Authorization Manager 606 used for authenticating the user, a Request Processor 614 to manage requests (e.g., verify that the person is correct for updating a slot), and a Read/Write module 610 that interfaces with cloud database 502. User database 608 stores user information and is utilized by Authorization Manager 606 to authenticate users making calls to the API.

Once the API 612 receives the RPC call 602, the API module parses the information and notifies the Authorization Manager 606, which then authenticates the user. If the authentication succeeds, the request processor 614 evaluates the call and checks whether the write is proper, which includes checking if the version in the write call is correct for writing to the requested slot.

If the version is not correct (because the version provided is old or stale), then Request Processor 614 denies the request and the API 612 returns an error to the requester, which is the cloud state manager 630 in device 620. However, if the version is correct, the write request is authorized and transferred to Read/Write module 610, which interfaces with cloud database 502 to write the information received in the RPC call (e.g., writing to slot 618 in the database).

Using slots enables the developer to be specific when saving data. The developer does not need to have a very large field for keeping all the game data. Instead, the developer is able to save incremental data as needed. For example, a developer could have one slot filled with the basic game data, and then store incremental updates over the basic data in other slots, or in other fields within the slot. The developer is able to utilize her own schema to store the data.

It is noted that all the devices can try simultaneous access to the database. The database is never locked, avoiding the problem of having one device lock the database (e.g., opening a file in the file system) and stopping other devices from accessing a particular data until the locking device releases the lock. This is sometimes referred to as "Optimistic Locking." In a typical file system, when an application opens a file, the file is locked for exclusive access by the application. Although sometimes other applications may read the file, the other applications are not able to write to this file. Embodiments of the invention allow different devices to compete when writing data to a slot in the database. In case of a race condition, one of the devices in the race will win, which guarantees that the data in the database is always consistent.

In another embodiment, data blobs are utilized. Instead of having the notion of slots and the key-value pairs, the API provides access to a data blob. In one embodiment, a simplified API is provided that includes three methods:

updateState(version, data), to update the state based on the person and the provided data;
getState( ) to get state information; and
clearState(version) to clear the state for the given version.

It is appreciated that the embodiments illustrated in FIG. 6 are exemplary. Other embodiments may utilize different modules, different APIs, deliver the functionality in different modules, combine the functionality of several modules into a single module, etc. The embodiments illustrated in FIG. 6 should therefore not be interpreted to be exclusive or limiting, but rather exemplary or illustrative.

Figure 7:
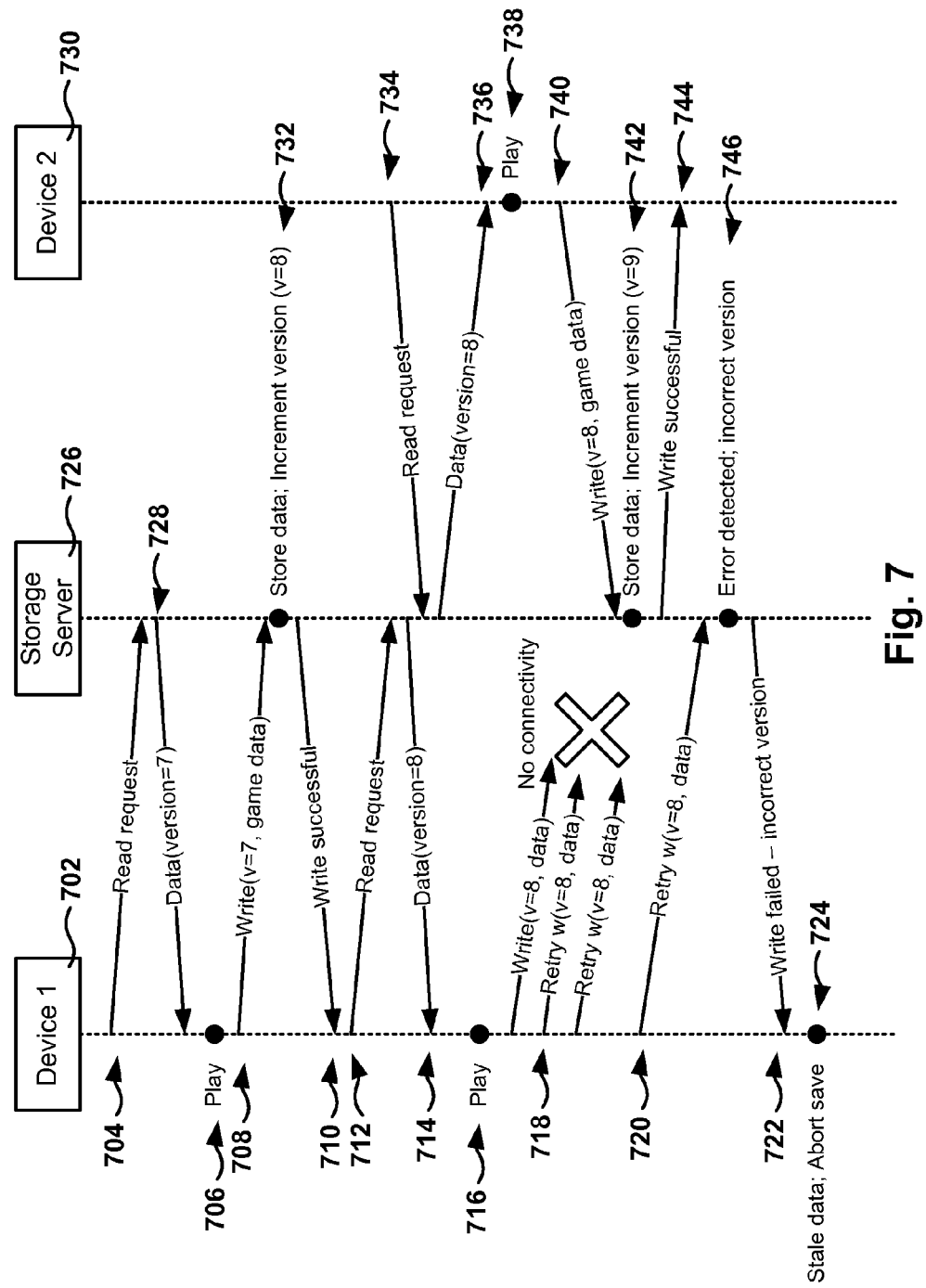
FIG. 7 illustrates the system response when multiple devices access the cloud storage, according to one embodiment.

FIG. 7 illustrates the system response when multiple devices access the cloud storage, according to one embodiment. FIG. 7 illustrates some interactions between device 702, device 730, and storage server 726. Initially, device 1 702 sends a read request 704 to storage server 726. In one embodiment, the read request is sent using an RPC call, but other types of protocols are also possible.

In response to the read request 704, the storage server sends 728 the data requested, which includes a version number of 7 associated with the data in the read slot. After the user plays the game 706 for a period of time, the device initiates a write operation to the database with the updated game information as a result of playing the game. Device 1 sends a write request 708 to storage server 726, where the write request 708 includes the version number to be updated (7) and the game data to be stored in the server.

After the storage server stores the data 732, the version number for the given slot is incremented to reflect that a new set of data has been stored in the slot. The current version number in the slot is now 8. In operation 710, storage server notifies device 1 that the write operation was successful and the data was saved.

The operations described below show how the system handles a race condition, where two devices are trying to update the same slot using the same version. In operation 712, device 1 sends a request to read a particular slot, and in operation 714 the storage server returns the data, which in this case includes the current version number with a value of 8.

After the player plays 716 the game for a while, device 1 tries 718 to write the updated data to the slot using the version value of 8. However, device 1 has lost connectivity to the storage server (e.g., a mobile phone does not have network connectivity). The game state is saved in a local cache and then later on, when the user gets connected to the Internet, the game state is saved into the cloud server. The program tries to periodically save the state until the program is successful, which is sometimes referred to as a persistent retry mechanism. Otherwise, without the retry mechanism a player may have the impression that the game was saved when it actually wasn't.

While device 1 is trying and re-trying to store the data, the user starts playing the same game in device 2. Device 2 sends a read request in operation 734 to obtain the data for the slot and the current version number. Since device 1 has not yet updated the version number, device 2 also gets 736 a version value of 8.

After playing 738 the game in device 2, device 2 sends a write request 740 with the game data and a version value of 8. In this case, the write request from device 2 reaches store server 726 before the retry write requests from device 1, which also have the version value of 8. In other words, the race to update the slot with version 8 is won by device 2. The storage server stores the data received from device 2 and increments 742 the version to a value of 9. The storage server then sends a write successful message 744 to device 2. It is noted that this procedure is also applied when two requests for the same slot, from two different devices, occur at the same time. The cloud storage server will select one of the requests to be processed, while the other request will be denied.

Returning now to the activity related to device 1, in operation 720, the write request from device 1 for version 8 finally reaches the storage server. The storage server checks the version, and observes that the current version for the slot is 9, which is newer than the version of 8 that device 1 is trying to update. Because the version received is stale, the storage server determines that an error has occurred because of the incorrect version 746. The request from device 1 is denied and a write-failed message, due to the incorrect version, is sent 722 to device 1. When device 1 receives the error message, the game in device 1 realizes that the data is too old and quits trying to store this data, i.e., the save is aborted 724. This mechanism for handling race conditions allows the developer to decide on the appropriate course of action for resolving the conflict. In this case, the developer would likely just retrieve the saved state for playing the game again in Device 1.

The data stored in the cloud server needs to make sense when considered as an aggregate, even if the data is stored incrementally. For example, if one device saves information indicating that the game has reached level 3 with a first position in the map of level 3. Then if a second device, where the game has reached level 2 and a certain position in the map of level 2, stores that the game is at level 2, without updating the position on the map, the system ends up with an inconsistency, because the position in the map does not match the corresponding level. The use of the version number avoids this problem. The system guarantees that the version number of the slot is monotonically increasing. Any time a write is performed, the version number is incremented.

Figure 8:
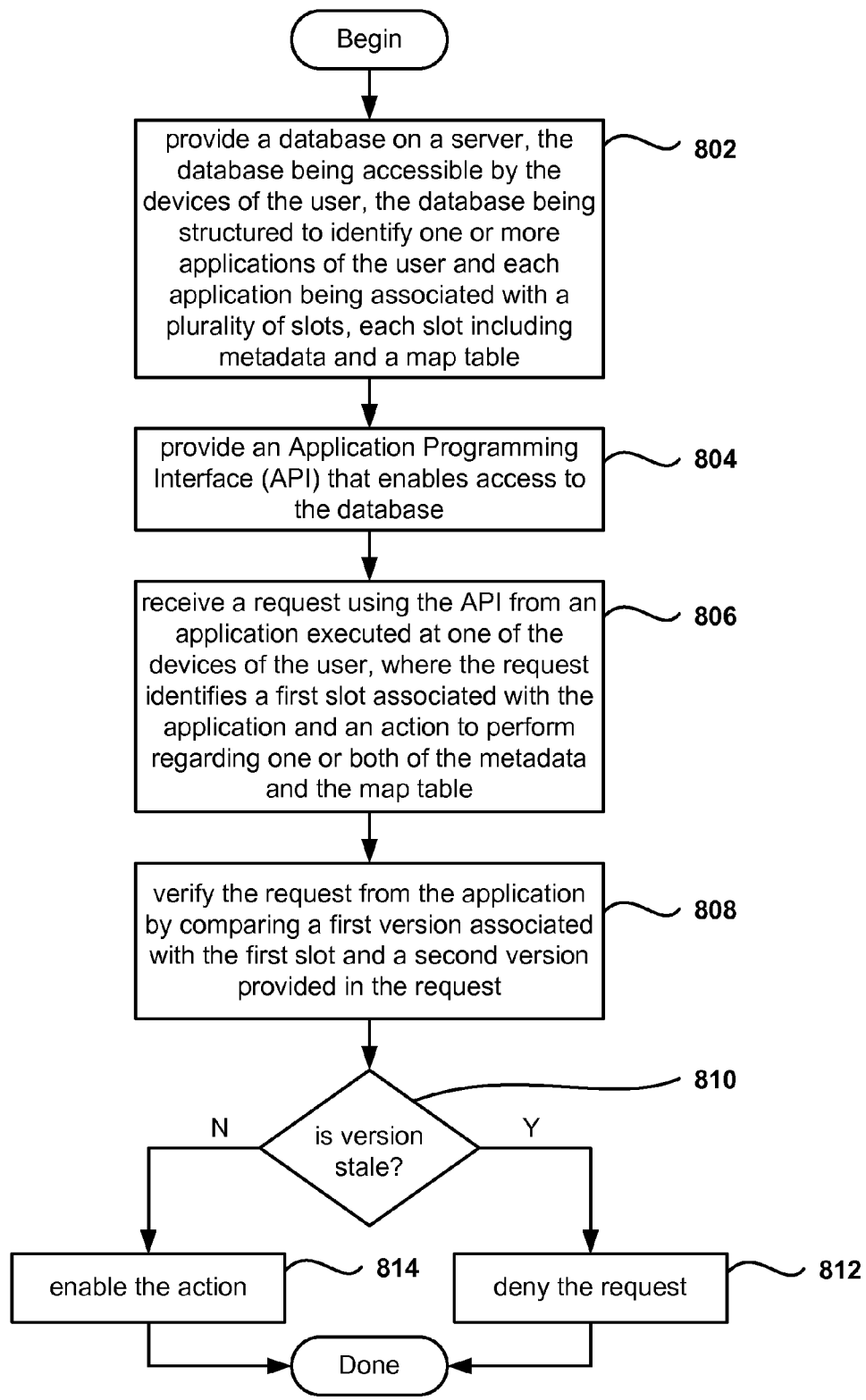
FIG. 8 shows a flowchart illustrating an algorithm for storing game state information in accordance with one embodiment of the invention.

FIG. 8 shows a flowchart illustrating an algorithm for storing game state information in accordance with one embodiment of the invention. In operation 802, a database is provided on a server. The database is accessible by the devices of the user and is structured to identify one or more applications of the user. Each application is associated with a plurality of slots, and each slot includes metadata and a map table.

Further, in operation 804, the server provides an API that enables access to the database. From operation 804, the method proceeds to operation 806, where a request is received using the API from an application executed at one of the devices of the user. The request identifies a first slot associated with the application and an action to perform regarding one or both of the metadata and the map table.

Further yet, in operation 808, the request from the application is verified, including comparing a first version associated with the first slot and a second version provided in the request. In operation 810, the method checks whether the version provided in the request is stale, as a result of the verification performed in operation 808. If the version is stale the request is denied in operation 812, and if the version is not stale the request is enabled in operation 814.

In another embodiment, a method includes an operation for, on a server, storing game data in at least one slot, the slot including slot version data. In one embodiment, the server includes a database that holds the slots for storing game data. In another embodiment, an Application Programming Interface (API) is provided by the server in order to receive database requests, and each application accesses slots that are associated with the respective application, and each application has access to one or more slots. In addition, the method further includes an operation for receiving a request to update the game data and a corresponding action. The request includes request version data. Further, the method includes another operation for determining whether the request to update is authorized based on a comparison of the slot version data and the request version data. The game data is updated based on the result of the determining, where the method is performed on a processor.

By providing version control, game developers are able to store a plurality of game states, and the system guarantees that application data may not be overwritten with data that is older than the data currently stored.

Figure 9:
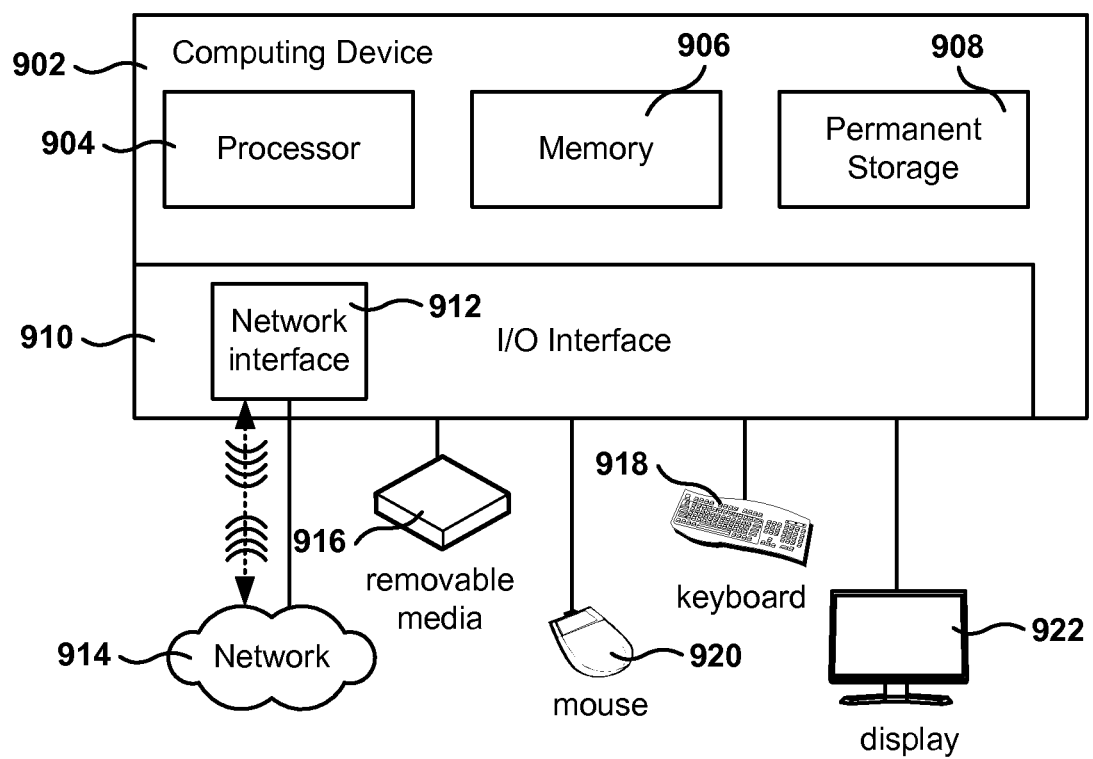
FIG. 9 is a simplified schematic diagram of a computer system for implementing embodiments of the present invention.

FIG. 9 is a simplified schematic diagram of a computer system 902 for implementing embodiments of the present invention. FIG. 9 depicts an exemplary computer environment for implementing embodiments of the invention. It should be appreciated that the methods described herein may be performed with a digital processing system, such as a conventional, general-purpose computer system. Special purpose computers, which are designed or programmed to perform only one function, may be used in the alternative. The computer system 902 includes a processor 904, which is coupled through a bus to memory 906, permanent storage 908, and Input/Output (I/O) interface 910.

Permanent storage 908 represents a persistent data storage device such as a hard drive or a USB drive, which may be local or remote. Network interface 912 provides connections via network 914, allowing communications (wired or wireless) with other devices. It should be appreciated that processor 904 may be embodied in a general-purpose processor, a special purpose processor, or a specially programmed logic device. Input/Output (I/O) interface 910 provides communication with different peripherals and is connected with processor 904, memory 906, and permanent storage 908, through the bus. Sample peripherals include display 922, keyboard 918, mouse 920, removable media device 916, etc.

Display 922 is configured to display the user interfaces described herein. Keyboard 918, mouse 920, removable media device 916, and other peripherals are coupled to I/O interface 910 in order to exchange information with processor 904. It should be appreciated that data to and from external devices may be communicated through I/O interface 910. Embodiments of the invention can also be practiced in distributed computing environments where tasks are performed by remote processing devices that are linked through a wired or a wireless network.

Embodiments of the present invention can be fabricated as computer readable code on a non-transitory computer readable storage medium. The non-transitory computer readable storage medium holds data which can be read by a computer system. Examples of the non-transitory computer readable storage medium include permanent storage 908, network attached storage (NAS), read-only memory or random-access memory in memory module 906, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor, such as processor 904 of FIG. 9. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A system comprising:
    a data store to store metadata and game data for one or more gaming applications of a user;
    a memory; and
    a processor coupled to the memory and the data store, the processor to:
        identify the one or more gaming applications of the user, the gaming applications being executed at a plurality of devices of the user;
        partition storage space of the data store for each of the one or more gaming applications;
        divide the storage space for each of the gaming applications into a corresponding plurality of slots, the plurality of slots storing the metadata and the game data, each metadata including version data indicating a version of data in a corresponding slot and a tag indicating whether the corresponding slot is empty, each slot comprising a plurality of fields;
        provide an Application Programming Interface (API) to store and retrieve the game data in the data store, wherein each of the gaming applications accesses the plurality of slots that are associated with the corresponding gaming application;
        receiving a read request for data associated with slots that are not empty, the request including the tag associated with indicating whether a slot is empty;
        determine a subset of slots of the plurality of slots that correspond to the tag associated with indicating whether a slot is empty;
        receive a database operation request, via the API, to perform a database operation for a single field of the plurality of fields of one of the subset of slots, the database operation request including version data indicating a version of data in the one of the subset of slots and an identifier of the single field;
        determine if the database operation request for the single field of the one of the subset of slots is authorized, the database operation request being authorized based on a comparison of the version data in the metadata of the one of the subset of slots and the version data in the database operation request; and
        enabling the database operation request based on determining that the database operation request is authorized.

2. The system of claim 1, wherein the database operation is a write operation and wherein to enable the database operation request the processor is to:
    write data received in the database operation request; and
    increment a value in the version data in the metadata for the one of the subset of slots.

3. The system of claim 1, wherein the processor is further to perform at least one of:
    send a write success message after writing data when the database operation request is authorized or send an error message when the database operation request is denied.

4. The system of claim 1, wherein each slot further comprises a map table, wherein the map table comprises the plurality of fields and data for each of the plurality of fields.

5. A method comprising:
    identifying, by one or more processors, one or more gaming applications of a user, the gaming applications being executed at a plurality of devices of the user;
    partitioning storage space of a data store for each of the one or more gaming applications;
    dividing the storage space for each of the gaming applications into a corresponding plurality of slots, the plurality of slots storing game data and metadata, each metadata including version data indicating a version of data in a corresponding slot and a tag indicating whether the corresponding slot is empty, each slot comprising a plurality of fields;
    providing an Application Programming Interface (API) to store and retrieve the game data in the data store, wherein each of the gaming applications accesses the plurality of slots that are associated with the corresponding gaming application;
    receiving a read request for data associated with slots that are not empty, the read request including the tag associated with indicating whether a slot is empty;
    determining a subset of slots of the plurality of slots that correspond to the tag associated with indicating whether a slot is empty;
    receiving a database operation request, via the API, to perform a database operation for a single field of the plurality of fields of one of the subset of slots, the database operation request including version data indicating a version of data in the one of the subset of slots and an identifier of the single field;
    determining if the database operation request for the single field of the one of the subset of slots is authorized, the database operation request being authorized based on a comparison of the version data in the metadata of the one of the subset of slots and the version data in the database operation request; and
    enabling the database operation request based on determining that the database operation request is authorized.

6. The method as recited in claim 5, wherein the database operation is a write operation and wherein enabling the database operation request further comprises:
    writing data received in the database operation request; and
    incrementing a value in the slot version data in the metadata for the one of the subset of slots.

7. The method as recited in claim 5, further comprising one of:
    sending a write success message after writing data when the database operation request is authorized or sending an error message when the database operation request is denied.

8. The method as recited in claim 5, wherein each slot further comprises a map table, wherein the map table comprises the plurality of fields and data for each of the plurality of fields.

9. A non-transitory computer-readable storage medium including instructions that, when executed by one or more processors, cause the one or more processors to perform operations comprising:
    identifying, by the one or more processors, one or more gaming applications of a user, the gaming applications being executed at a plurality of devices of the user;
    partitioning storage space of a data store for each of the one or more gaming applications;

dividing the storage space for each of the gaming applications into a corresponding plurality of slots, the plurality of slots storing game data and metadata, each metadata including version data indicating a version of data in a corresponding slot and a tag indicating whether the corresponding slot is empty, each slot comprising a plurality of fields;

providing an Application Programming Interface (API) to store and retrieve the game data in the data store, wherein each of the gaming applications accesses the plurality of slots that are associated with the corresponding gaming application;

receiving a read request for data associated with slots that are not empty, the read request including the tag associated with indicating whether a slot is empty;

determining a subset of slots of the plurality of slots that correspond to the tag associated with indicating whether a slot is empty;

receiving a database operation request, via the API, to perform a database operation for a single field of the plurality of fields of one of the subset of slots, the database operation request including version data indicating a version of data in the one of the subset of slots and an identifier of the single field;

determining if the database operation request for the single field of the one of the subset of slots is authorized, the database operation request being authorized based on a comparison of the version data in the metadata of the one of the subset of slots and the version data in the database operation request; and enabling the database operation request based on determining that the database operation request is authorized.

10. The non-transitory computer-readable storage medium as recited in claim 9, wherein the database operation is a write operation, wherein enabling the database operation request further comprises:

writing data received in the database operation request; and incrementing a value in the version data in the metadata for the one of the subset of slots.

11. The non-transitory computer-readable storage medium as recited in claim 9, the operations further comprising one of sending a write success message after writing data when the database operation request is authorized or sending an error message when the database operation request is denied.

12. The non-transitory computer-readable storage medium as recited in claim 9, wherein each slot further comprises a map table, wherein the map table comprises the plurality of fields and data for each of the plurality of fields.

* * * * *